United States Patent
Shankar et al.

(10) Patent No.: US 10,957,033 B2
(45) Date of Patent: Mar. 23, 2021

(54) REPEATER DEFECT DETECTION

(71) Applicant: KLA-Tencor Corporation, Milpitas, CA (US)

(72) Inventors: Premchandra M. Shankar, Fremont, CA (US); Ashok Varadarajan, Fremont, CA (US); JuHwan Rha, San Jose, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 139 days.

(21) Appl. No.: 15/704,900

(22) Filed: Sep. 14, 2017

(65) Prior Publication Data

US 2019/0012778 A1    Jan. 10, 2019

Related U.S. Application Data

(60) Provisional application No. 62/530,699, filed on Jul. 10, 2017.

(51) Int. Cl.
*G06K 9/00* (2006.01)
*G06T 7/00* (2017.01)
*G06T 5/50* (2006.01)

(52) U.S. Cl.
CPC .......... *G06T 7/001* (2013.01); *G06T 5/50* (2013.01); *G06T 7/0008* (2013.01); *G06T 2207/20221* (2013.01); *G06T 2207/20224* (2013.01); *G06T 2207/30148* (2013.01)

(58) Field of Classification Search
None
See application file for complete search history.

(56) References Cited

U.S. PATENT DOCUMENTS

| | | | |
|---|---|---|---|
| 8,204,296 B2 | 6/2012 | Bhaskar et al. | |
| 2005/0104017 A1* | 5/2005 | Kimba | G06T 7/001 250/559.07 |
| 2005/0105791 A1* | 5/2005 | Lee | G01N 21/47 382/145 |
| 2005/0282299 A1 | 12/2005 | Kim et al. | |
| 2006/0291714 A1* | 12/2006 | Wu | G01N 21/95607 382/149 |
| 2007/0286473 A1* | 12/2007 | Leslie | G01N 21/9501 382/146 |
| 2009/0080759 A1 | 3/2009 | Bhaskar et al. | |
| 2010/0329540 A1* | 12/2010 | Bhaskar | G01N 21/93 382/149 |
| 2013/0129187 A1* | 5/2013 | Maxwell | G01N 21/95 382/141 |
| 2013/0250287 A1* | 9/2013 | Chen | G01N 21/9501 356/237.5 |

(Continued)

OTHER PUBLICATIONS

ISA/KR, ISR and WO for PCT/US2018/041178, Nov. 15, 2018.

(Continued)

*Primary Examiner* — Sean M Conner
(74) *Attorney, Agent, or Firm* — Hodgson Russ LLP

(57) ABSTRACT

Repeater defects on a wafer can be detected by fusing multiple die images. In an instance, multiple die images are statistically fused to form a die-fused image. Each of the die images can be of a different die on a wafer. A presence of a repeater defect is detected in the die-fused image. The die images can be generated using a laser-scanning system or other systems.

19 Claims, 5 Drawing Sheets

(56) References Cited

U.S. PATENT DOCUMENTS

2014/0193065 A1 7/2014 Chu et al.
2016/0209334 A1 7/2016 Chen et al.

OTHER PUBLICATIONS

Ang et al., "A Comparative Analysis of Image Fusion Methods," IEEE Transactions on Geoscience and Remote Sensing, 2005, 1391-1402, vol. 43, No. 6.

* cited by examiner

REPEATER DEFECT DETECTION

CROSS-REFERENCE TO RELATED APPLICATIONS

This application claims priority to the provisional patent application filed Jul. 10, 2017 and assigned U.S. App. No. 62/530,699, the disclosure of which is hereby incorporated by reference.

FIELD OF THE DISCLOSURE

This disclosure relates to detecting repeater defects.

BACKGROUND OF THE DISCLOSURE

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

Fabricating semiconductor devices, such as logic and memory devices, typically includes processing a semiconductor wafer using a large number of semiconductor fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Repeater defects are a concern to semiconductor manufacturers. Repeater defects are those defects that appear on a wafer with some regular periodicity and that show some fixed relationship to the die layout on a reticle or stepping pattern on a wafer. The repeater defects are often programmed defects. Reticle defects are a common cause of repeater defects. Reticle defects that can cause repeater defects include, for example, extra chrome pattern on a mask plate, missing chrome on a mask plate, particulates on the mask plate or on the reticle, and damage to the pellicle.

An array mode algorithm and single die inspection have been used with laser-scanning inspection systems to perform repeater defect detection. Both techniques use information from a single die image in each inspection channel of the laser-scanning inspection system. As a result, sensitivity is limited by signal and noise within a single die image. Using statistics from a single die image is prone to nuisances.

Therefore, an improved technique to detect repeater defects is needed.

BRIEF SUMMARY OF THE DISCLOSURE

In a first embodiment, a method is provided. A plurality of die images are statistically fused to form a die-fused image using a controller. Each of the die images is of a different die. The plurality of die images includes images from multiple inspection channels. Using the controller, a presence of a repeater defect is detected in the die-fused image.

The detecting can use statistical image processing. The statistical fusing can include fusing signals or a signal-to-noise ratio.

The multiple inspection channels can include a bright field inspection channel and a dark field inspection channel.

Each of the die images may be of a single wafer.

The method can further comprise, using the controller, subtracting a background and scaling for background noise using the controller.

The plurality of die images can include at least three of the die images.

The die images may be formed using at least one of laser inspection and broad band plasma inspection.

In a second embodiment, a non-transitory computer readable medium storing a program is provided. The program is configured to instruct a processor to statistically fuse a plurality of die images to form a die-fused image. Each of the die images is of a different die. The plurality of die images includes images from multiple inspection channels. A presence of a repeater defect is detected in the die-fused image.

The repeater defect can be detected using statistical image processing. The plurality of die images can be statistically fused by fusing signals or a signal-to-noise ratio.

The multiple inspection channels can include a bright field inspection channel and a dark field inspection channel.

Each of the die images may be of a single wafer.

The program may be further configured to instruct the processor to subtract a background and scale for background noise.

The plurality of die images can include at least three of the die images.

In a third embodiment, a system is provided. The system comprises a chuck configured to hold a wafer; a measurement system configured to inspect the wafer on the chuck; and a controller including a processor, a memory, and a communication port in electronic communication with the measurement system. The measurement system includes at least two inspection channels. The controller is configured to statistically fuse a plurality of die images to form a die-fused image and detect a presence of a repeater defect in the die-fused image. Each of the die images is of a different die. The plurality of die images includes images from each of the at least two inspection channels. The at least two inspection channels can include a bright field inspection channel and a dark field inspection channel. The system may be one of a laser-scanning inspection system and a broad band plasma inspection system.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein improve the sensitivity of a laser-scanning inspection system to repeater defects on a wafer. Incorporation of spatial correlation on multiple die images using, for example, a laser-scanning inspection system can improve inspection. Die fusion as disclosed herein shows particular usefulness during repeater defect inspection, such as with laser-scanning tools. Repeater defects are often programmed defects, detection of which is important to semiconductor manufacturers. Die fusion increases the sensitivity of laser-scanning inspection system to repeater defects and other programmed defects.

Figure 1:
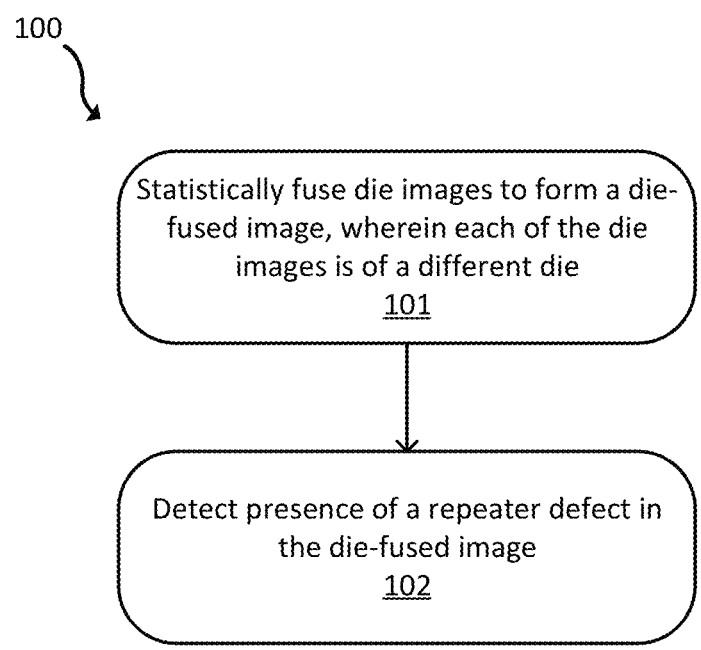
FIG. 1 is a flowchart of an embodiment in accordance with the present disclosure.

FIG. 1 is a flowchart of a method 100. The method 100 can improve the sensitivity of a laser-scanning inspection system, broad-band plasma system, or other inspection system to repeater defects on dies of a wafer. Die fusion combines information from multiple dies within an inspection channel instead of relying on single die image as in existing methods. Image pixel information from multiple dies within a processing unit (job) in, for example, a laser-scanning inspection system is fused to exploit spatial correlation of defect signal on multiple die images. By virtue of the fusion operation, signal to noise ratio (SNR) of repeating defects increases, whereas SNR of non-repeating defects decreases.

At 101, a plurality of die images are statistically fused to form a die-fused image using a controller. Each of the die images is of a different die. The die images may all be from a single wafer, though images of dies having a similar structure from different wafers also can be used. Statistically fusing the die images can include fusing signals or a SNR ratio. In an instance, pixel intensities from die images can directly be fused together. In another instance, pixel intensities can be first pre-processed using the statistics of an image background and then the preprocessed pixels from die images are fused.

The number of die images can vary. For example, two, three, four, five, ten, fifteen, or more die images can be fused. In an instance, three die images may be fused. Dies that are relatively far apart (e.g., more than five dies apart) can be quite different in terms of process variation and, consequently, fusing them may introduce mixing of unwanted process variation. Inspection systems may have limitations on how many die images can be acquired and used at the same time. For example, only three dies can be processed at a time on certain inspection systems.

Die images can be provided by any inspection system. For example, the die images can be formed using at least one of laser inspection (e.g., with a laser-scanning inspection system) and broad band plasma inspection.

The plurality of die images can be provided by a single inspection channel or by multiple inspection channels. The die-fused image can be formed by fusing images from a single inspection channel or from multiple inspection channels. In an instance, images of the same die using two different inspection channels are fused. In another instance, images of different dies using two different inspection channels are fused. In yet another instance, images of the same die and different dies using two different inspection channels are fused.

The die images used in image fusion are typically already registered. Incorrect registration may lead to errors during image fusion, so die images can be registered if necessary.

Some examples of image fusion that can be used include high pass filtering technique, intensity-hue-saturation (HIS) transform based image fusion, principal component analysis (PCA) based image fusion, wavelet transform image fusion, or pair-wise spatial frequency matching.

At 102, a presence of a repeater defect in the die-fused image is detected using the controller. The detecting can use statistical image processing. For example, after die images are fused in any above mentioned approaches, a thresholding can be applied to fused image pixels to detect repeater defects. A set of constraints on fused pixel values and/or relative strengths of pixels values among die images also can be used to make the detection more robust.

To assist in the detection of repeater defects, a background can be subtracted using the controller and/or background noise can be scaled using the controller.

A threshold for fused image pixels can be set before or during detection of repeater defects. This threshold may be provided by a user.

Figure 2:
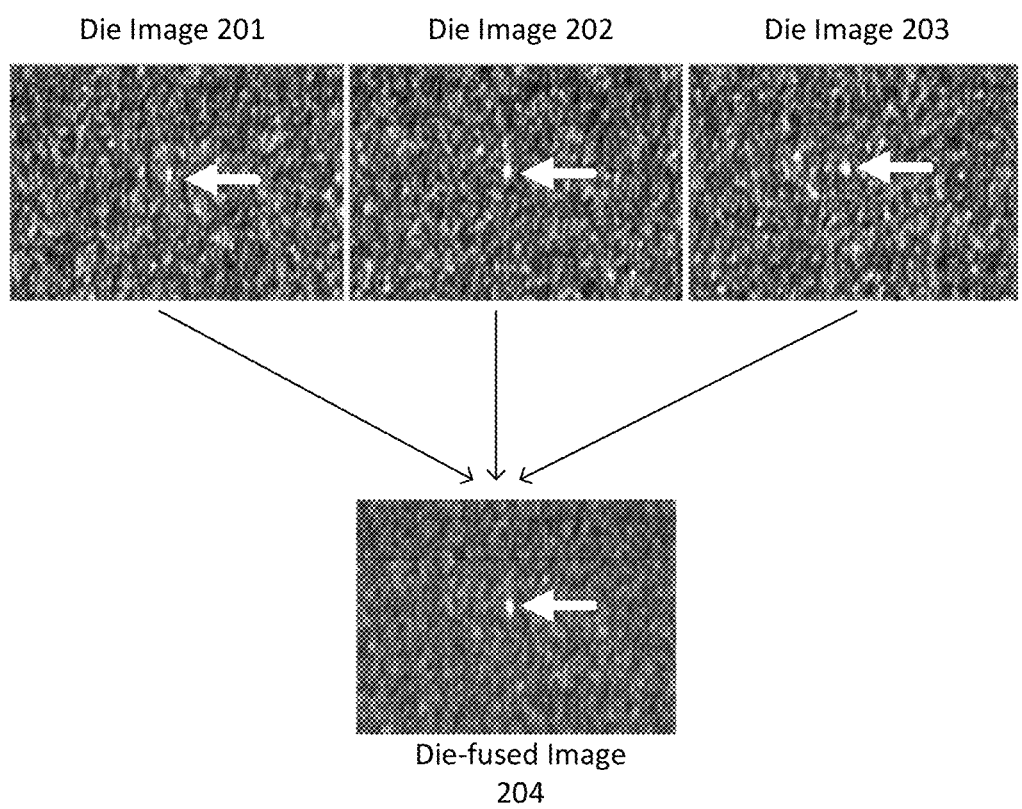
FIG. 2 illustrates an exemplary image fusion in accordance with the present disclosure.

FIG. 2 illustrates an exemplary image fusion. Three die images are disclosed. Repeater defects are generally spatially correlated in images of multiple dies inside a processing unit in a wafer inspection system, such as a laser-scanning inspection system. Die image 201, 202, and 203 each illustrate a repeater defect in the center (identified with an arrow). The defects can be consecutively placed on the wafer, but need not be consecutive. Repeater defects are difficult to detect due to the noise in each of the images. Therefore, it is possible that one of the repeater defects can be missed during defect detection. Besides a potential impact to yield caused by missing a repeater defect, it is possible that a repeater defect may not be correctly identified because the defect pattern across multiple dies may not be evident during defect detection.

Information from multiple die images 201-203 in the processing unit is statistically fused to form a die-fused image 204. Statistical image processing then is used on the die-fused image 204 to detect defects and abnormalities. By virtue of fusion, a signal from the repeater defects will be amplified whereas signal from non-repeating nuisances will be diminished in the die-fused image. In one example, repeater defect signals improved from 40% to 148% relative to previous techniques. This maximizes all available image information about the repeater image and exploits the spatial correlation of the repeater defect signal on multiple dies.

Figure 3:
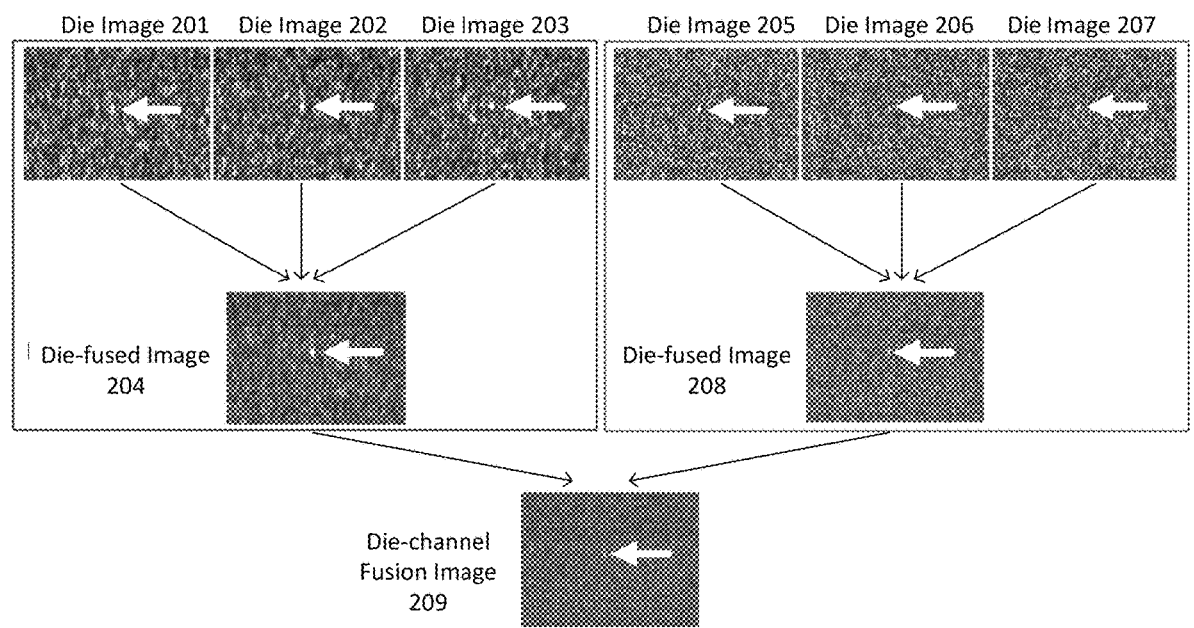
FIG. 3 illustrates an exemplary image fusion using multiple inspection channels in accordance with the present disclosure.

Laser-scanning inspection systems and other inspection systems may have more than one imaging/inspection channel. Die fusion can be extended to fuse information in multiple die images from more than one inspection/imaging channels. FIG. 3 illustrates an exemplary image fusion using multiple inspection channels. Each inspection channel produces a die-fused image. The two die-fused images are then fused to form a die-channel fusion image.

Die images 201-203 come from a first inspection channel. These die images 201-203 are statistically fused to form a die-fused image 204. This may be, for example, a bright field inspection channel.

Die images 205-207 come from a second inspection channel. These die images 205-207 are statistically fused to form a die-fused image 208. This may be, for example, a dark field inspection channel.

While bright field and dark field inspection channels are used in this example, the first and second inspection channels also can be two bright field inspection channels or two dark field inspection channels from a laser-scanning inspection system.

The die-fused image 204 and die-fused image 208 can be statistically fused to form the die-channel fusion image 209.

In the example of FIG. 3, the raw images have a SNR of 8.9. The die-fused image 204 has a SNR of 22.1. The die-channel fusion image has a SNR or 27.4.

While the three images are illustrated as being fused together, more or fewer images can be fused. For example, only two may be fused.

Figure 4:
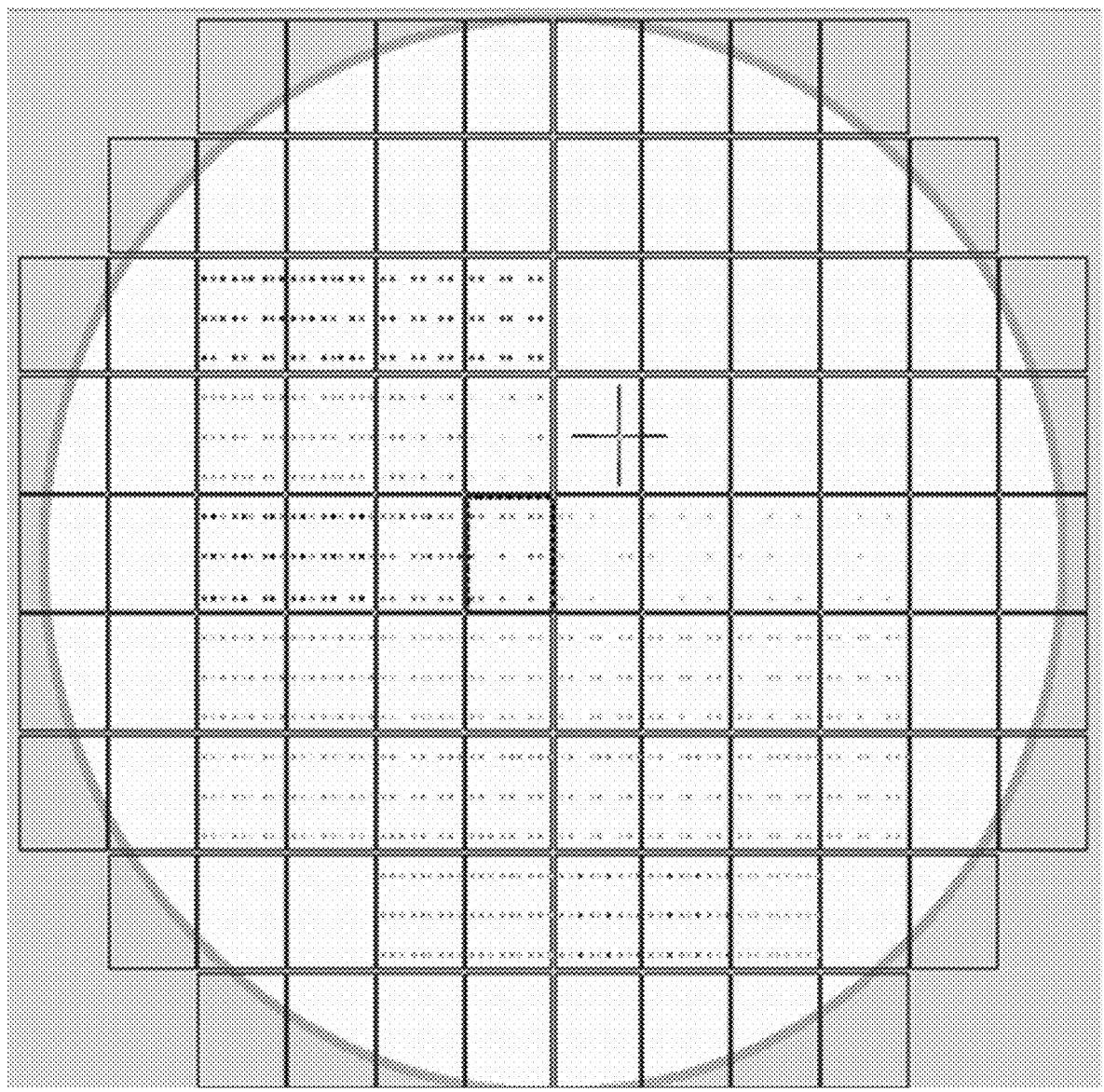
FIG. 4 illustrates an exemplary wafer with resulting repeater defects identified.

FIG. 4 illustrates an exemplary wafer with resulting repeater defects identified. As seen in FIG. 4, the repeater defects are on multiple dies across the wafer. Embodiments disclosed herein using multiple die images will improve the sensitivity of laser-scanning wafer inspection system or other inspection systems with respect to repeater defects while reducing the nuisance (non-repeating) signals.

The example of FIG. 4 shows 747 repeater defects on the wafer, which was part of a total defect count of 5,666. Each repeater defect is illustrated as a dot on the wafer. A previous repeater defect analysis algorithm found 627 repeater defects as part of a total defect count of 10,076. Thus, improved sensitivity at lower nuisance counts is provided using die fusion.

Figure 5:
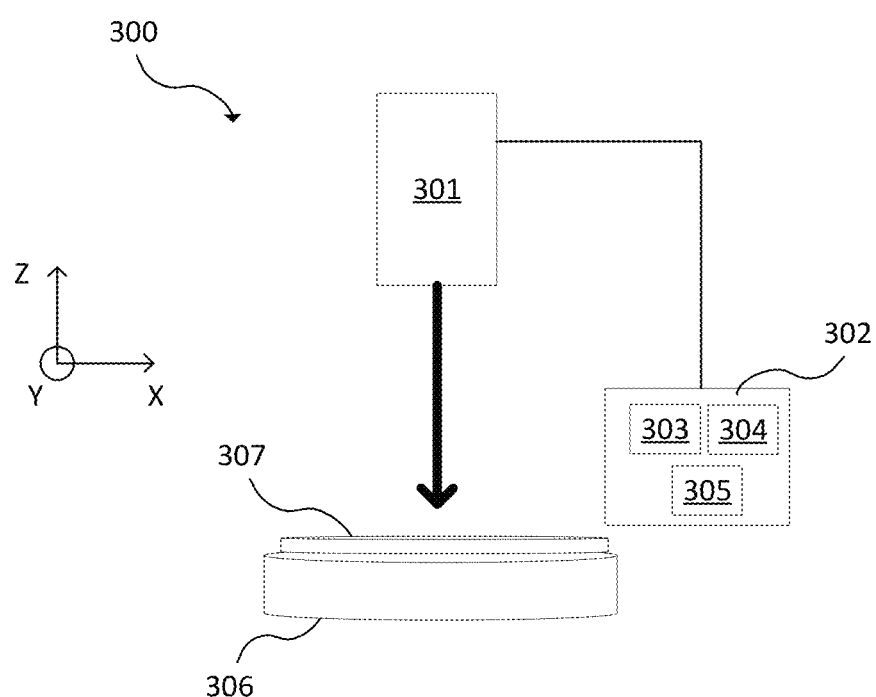
FIG. 5 is a block diagram of a system in accordance with the present disclosure.

FIG. 5 is a block diagram of an embodiment of a system 300. The system 300 includes a chuck 306 configured to hold a wafer 307 or other workpiece. The chuck 306 may be configured to move or rotate in one, two, or three axes. The chuck 306 also may be configured to spin, such as around the Z-axis.

The system 300 also includes a measurement system 301 configured to measure a surface of the wafer 307. The measurement system 301 may produce a beam of light, a beam of electrons, broad band plasma, or may use other techniques to measure a surface of the wafer 307. In one example, the measurement system 301 includes a laser and the system 300 is a laser-scanning system. In another example, the system 300 is a broad-band plasma inspection tool. The measurement system 301 can provide images of dies on the wafer 307 or can provide information used to form images of dies on the wafer 307. The measurement system 301 can includes at least two inspection channels, such as bright field and dark field inspection channels, two bright field inspection channels, or two dark field inspection channels.

The system 300 communicates with a controller 302. For example, the controller 302 can communicate with the measurement system 301 or other components of the system 300. The controller 302 can include a processor 303, an electronic data storage unit 304 in electronic communication with the processor 303, and a communication port 305 in electronic communication with the processor 303. It is to be appreciated that the controller 302 may be implemented in practice by any combination of hardware, software, and firmware. Also, its functions as described herein may be performed by one unit, or divided up among different components, each of which may be implemented in turn by any combination of hardware, software and firmware. Program code or instructions for the controller 302 to implement various methods and functions may be stored in controller readable storage media, such as a memory in the electronic data storage unit 304, within the controller 302, external to the controller 302, or combinations thereof.

The controller 302 can include one or more processors 303 and one or more electronic data storage units 304. Each processor 303 may be in electronic communication with one or more of the electronic data storage units 304. In an embodiment, the one or more processors 303 are communicatively coupled. In this regard, the one or more processors 303 may receive readings received at the measurement system 301 and store the reading in the electronic data storage unit 304 of the controller 302. The controller 302 may be part of the system itself or may be separate from the system (e.g., a standalone control unit or in a centralized quality control unit).

The controller 302 may be coupled to the components of the system 300 in any suitable manner (e.g., via one or more transmission media, which may include wired and/or wireless transmission media) such that the controller 302 can receive the output generated by the system 300, such as output from the measurement system 301. The controller 302 may be configured to perform a number of functions using the output. For instance, the controller 302 may be configured to perform an inspection of the wafer 307. In another example, the controller 302 may be configured to send the output to an electronic data storage unit 304 or another storage medium without reviewing the output. The controller 302 may be further configured as described herein.

The controller 302, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors that executes instructions from a memory medium. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

The system 300 may be part of a defect review system, an inspection system, a metrology system, or some other type of system. Thus, the embodiments disclosed herein describe some configurations that can be tailored in a number of manners for systems having different capabilities that are more or less suitable for different applications.

The controller 302 may be in electronic communication with the measurement system 301 or other components of the system 300. The controller 302 may be configured according to any of the embodiments described herein. The controller 302 also may be configured to perform other functions or additional steps using the output of the measurement system 301 or using images or data from other sources.

An additional embodiment relates to a non-transitory computer-readable medium storing program instructions executable on a controller for performing a computer-implemented method defocus detection, as disclosed herein. In particular, as shown in FIG. 5, the controller 302 can include a memory in the electronic data storage unit 304 or other electronic data storage medium with non-transitory computer-readable medium that includes program instructions executable on the controller 302. The computer-implemented method may include any step(s) of any method(s) described herein. For example, the controller 302 may be programmed to perform some or all of the steps of FIG. 1. In an instance, the controller 302 may statistically fuse a plurality of die images to form a die-fused image, wherein each of the die images is of a different die, and then detect a presence of a repeater defect in the die-fused image. The memory in the electronic data storage unit 304 or other electronic data storage medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes (MFC), SSE (Streaming SIMD Extension), or other technologies or methodologies, as desired.

In another embodiment, the controller 302 may be communicatively coupled to any of the various components or sub-systems of system 300 in any manner known in the art. Moreover, the controller 302 may be configured to receive and/or acquire data or information from other systems (e.g., inspection results from an inspection system such as a review tool, a remote database including design data and the like) by a transmission medium that may include wired and/or wireless portions. In this manner, the transmission medium may serve as a data link between the controller 302 and other subsystems of the system 300 or systems external to system 300.

In some embodiments, various steps, functions, and/or operations of system 300 and the methods disclosed herein are carried out by one or more of the following: electronic circuits, logic gates, multiplexers, programmable logic devices, ASICs, analog or digital controls/switches, microcontrollers, or computing systems. Program instructions implementing methods such as those described herein may be transmitted over or stored on carrier medium. The carrier medium may include a storage medium such as a read-only memory, a random access memory, a magnetic or optical disk, a non-volatile memory, a solid state memory, a magnetic tape and the like. A carrier medium may include a transmission medium such as a wire, cable, or wireless transmission link. For instance, the various steps described throughout the present disclosure may be carried out by a single controller 302 (or computer system) or, alternatively, multiple controllers 302 (or multiple computer systems). Moreover, different sub-systems of the system 300 may include one or more computing or logic systems. Therefore, the above description should not be interpreted as a limitation on the present disclosure but merely an illustration.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Other types of wafers also may be used. For example, the wafer may be used to manufacture LEDs, solar cells, magnetic discs, flat panels, or polished plates. Defects on other objects also may be classified using techniques and systems disclosed herein.

Each of the steps of the method may be performed as described herein. The methods also may include any other step(s) that can be performed by the controller and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
statistically fusing a plurality of die images from a first inspection channel to form a first die-fused image using a controller, wherein each of the die images from the first inspection channel is of a different die, wherein the plurality of die images from the first inspection channel includes at least ten of the die images, and wherein each of the dies in the die images from the first inspection channel is less than five dies apart from each other of the dies in the die images from the first inspection channel;
statistically fusing a plurality of die images from a second inspection channel to form a second die-fused image using the controller, wherein each of the die images from the second inspection channel is of a different die, wherein the plurality of die images from the second inspection channel includes at least ten of the die images, wherein each of the dies in the die images from the second inspection channel is less than five dies apart from each other of the dies in the die images from the second inspection channel, and wherein a signal of a repeater defect is amplified in the first die-fused image compared to the first plurality of die images or in the second die-fused image compared to the second plurality of die images;
statistically fusing the first die-fused image and the second die-fused image to form a die-channel fusion image using the controller; and detecting, using the controller, a presence of the repeater defect in the die-channel fusion image using statistical image processing.

2. The method of claim 1, wherein the statistically fusing includes fusing signals.

3. The method of claim 1, wherein the statistically fusing includes fusing a signal-to-noise ratio.

4. The method of claim 1, wherein the first inspection channel is a bright field inspection channel and the second inspection channel is a dark field inspection channel.

5. The method of claim 1, wherein each of the die images is from a single wafer.

6. The method of claim 1, further comprising subtracting a background using the controller and scaling for background noise using the controller.

7. The method of claim 1, wherein the die images from the first inspection channel and from the second inspection channel are formed using at least one of laser inspection or broad band plasma inspection.

8. The method of claim 1, wherein the repeater defect is caused by a reticle defect.

9. The method of claim 1, further comprising pre-processing pixel intensities of the plurality of die images from the first inspection channel and the second inspection channel using the controller, wherein the pre-processing uses statistics of an image background.

10. The method of claim 1, wherein the statistical image processing is based on thresholding and a spatial correlation between the repeater defect in each of the die images from the first inspection channel and the die images from the second inspection channel.

11. The method of claim 10, wherein the thresholding includes relative strengths of pixel values among the die images from the first inspection channel and the die images from the second inspection channel.

12. A non-transitory computer readable medium storing a program configured to instruct a processor to:
   statistically fuse a plurality of die images from a first inspection channel to form a first die-fused image, wherein each of the die images from the first inspection channel is of a different die, wherein the plurality of die images from the first inspection channel includes at least ten of the die images, and wherein each of the dies in the die images from the first inspection channel is less than five dies apart from each other of the dies in the die images from the first inspection channel;
   statistically fuse a plurality of die images from a second inspection channel to form a second die-fused image, wherein each of the die images from the second inspection channel is of a different die, wherein the plurality of die images from the second inspection channel includes at least ten of the die images, wherein each of the dies in the die images from the second inspection channel is less than five dies apart from each other of the dies in the die images from the second inspection channel, and wherein a signal of a repeater defect is amplified in the first die-fused image compared to the first plurality of die images or in the second die-fused image compared to the second plurality of die images;
   statistically fuse the first die-fused image and the second die-fused image to form a die-channel fusion image; and
   detect a presence of the repeater defect in the die-channel fusion image using statistical image processing.

13. The non-transitory computer readable medium of claim 12, wherein the plurality of die images are statistically fused by fusing signals.

14. The non-transitory computer readable medium of claim 12, wherein the plurality of die images are statistically fused by fusing a signal-to-noise ratio.

15. The non-transitory computer readable medium of claim 12, wherein the first inspection channel is a bright field inspection channel and the second inspection channel is a dark field inspection channel.

16. The non-transitory computer readable medium of claim 12, wherein each of the die images is from a single wafer.

17. The non-transitory computer readable medium of claim 12, wherein the program is further configured to instruct the processor to subtract a background and scale for background noise.

18. A system comprising:
   a chuck configured to hold a wafer;
   a measurement system that produces a beam of light, wherein the measurement system is configured to inspect the wafer on the chuck, wherein the measurement system includes one of a laser source or a broad band plasma source, and wherein the measurement system includes at least a first inspection channel and a second inspection channel; and
   a controller including a processor, a memory, and a communication port in electronic communication with the measurement system, wherein the controller is configured to:
      statistically fuse a plurality of die images from the first inspection channel to form a first die-fused image, wherein each of the die images from the first inspection channel is of a different die, wherein the plurality of die images from the first inspection channel includes at least ten of the die images, and wherein each of the dies in the die images from the first inspection channel is less than five dies apart from each other of the dies in the die images from the first inspection channel;
      statistically fuse a plurality of die images from the second inspection channel to form a second die-fused image, wherein each of the die images from the second inspection channel is of a different die, wherein the plurality of die images from the second inspection channel includes at least ten of the die images, wherein each of the dies in the die images from the second inspection channel is less than five dies apart from each other of the dies in the die images from the second inspection channel, and wherein a signal of a repeater defect is amplified in the first die-fused image compared to the first plurality of die images or in the second die-fused image compared to the second plurality of die images;
      statistically fuse the first die-fused image and the second die-fused image to form a die-channel fusion image; and
      detect a presence of the repeater defect in the die-channel fusion image.

19. The system of claim 18, wherein the first inspection channel is a bright field inspection channel and the second inspection channel is a dark field inspection channel.

* * * * *